(12) United States Patent
Hao

(10) Patent No.: US 9,137,099 B2
(45) Date of Patent: Sep. 15, 2015

(54) METHOD, DEVICE, AND SYSTEM FOR LINK AGGREGATION FAILURE PROTECTION

(71) Applicant: Huawei Technologies Co., Ltd., Shenzhen, Guangdong (CN)

(72) Inventor: Jiangtao Hao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 183 days.

(21) Appl. No.: 13/728,870

(22) Filed: Dec. 27, 2012

(65) Prior Publication Data

US 2013/0121141 A1    May 16, 2013

Related U.S. Application Data

(63) Continuation of application No. PCT/CN2011/075367, filed on Jun. 7, 2011.

(30) Foreign Application Priority Data

Sep. 14, 2010  (CN) .......................... 2010 1 0282752

(51) Int. Cl.
*H04L 12/24*    (2006.01)
*H04L 12/709*    (2013.01)
*H04L 12/703*    (2013.01)

(52) U.S. Cl.
CPC ........ *H04L 41/0668* (2013.01); *H04L 41/0663* (2013.01); *H04L 45/245* (2013.01); *H04L 45/28* (2013.01); *H04L 41/0654* (2013.01); *Y02B 60/33* (2013.01)

(58) Field of Classification Search
None
See application file for complete search history.

(56) References Cited

U.S. PATENT DOCUMENTS

| 6,377,584 B1* | 4/2002 | Kano et al. ................... 370/423 |
| 2003/0061533 A1* | 3/2003 | Perloff et al. .................... 714/9 |

(Continued)

FOREIGN PATENT DOCUMENTS

| CN | 1913414 A | 2/2007 |
| CN | 101026486 A | 8/2007 |

(Continued)

OTHER PUBLICATIONS

Tony Jeffree, et al., "Supplement to Carrier Sense Multiple Access with Collision Detection (CSMA/CD) Access Method & Physical Layer Specifications: Link Aggregation", IEEE Draft P802.3ad/D2.0, LAN MAN Standards Committee, Jul. 17, 1999, 177 pages.

(Continued)

*Primary Examiner* — Derrick Ferris
*Assistant Examiner* — Kodzovi Acolatse

(57) ABSTRACT

A method for link aggregation failure protection includes: receiving failure information including a failure location and an identity of more than one corresponding logical link, a failed physical link and more than one physical link form an LAG, each physical link in the LAG corresponds to logical links with a same identity, and the logical links with the same identity in the LAG correspond to an RSP device of a backbone layer and a receiving device of an access layer and forward data separately through more than two aggregation devices at an aggregation layer locating between the backbone layer and the access layer; according to the failure information, bundling a logical link corresponding to the failed physical link with a logical link corresponding to a physical link without failure in the LAG to form a logical LAG; and transmitting, through the logical LAG, data sent to the failed physical link.

11 Claims, 9 Drawing Sheets

(56) References Cited

U.S. PATENT DOCUMENTS

| | | |
|---|---|---|
| 2003/0097470 A1 | 5/2003 | Lapuh et al. |
| 2003/0185249 A1* | 10/2003 | Davies et al. ............... 370/535 |
| 2004/0184474 A1 | 9/2004 | Kim et al. |
| 2005/0198371 A1* | 9/2005 | Smith et al. ............... 709/238 |
| 2008/0002570 A1 | 1/2008 | Kurokawa et al. |
| 2010/0020806 A1 | 1/2010 | Vahdat et al. |

FOREIGN PATENT DOCUMENTS

| | | |
|---|---|---|
| CN | 101330405 A | 12/2008 |
| CN | 101938377 A | 1/2011 |
| WO | WO 2007/095797 A1 | 8/2007 |

OTHER PUBLICATIONS

International Search Report dated Sep. 1, 2011 in connection with International Patent Application No. PCT/CN2011/075367.

Roger Lapuh, et al., "Split Multi-link Trunking (SMLT)", Internet-Draft, Jul. 7, 2008, 15 pages.

* cited by examiner

METHOD, DEVICE, AND SYSTEM FOR LINK AGGREGATION FAILURE PROTECTION

CROSS REFERENCE TO RELATED APPLICATIONS

This application is a continuation of International Application No. PCT/CN2011/075367, filed on Jun. 7, 2011, which claims priority to Chinese Patent Application No. 201010282752.3, filed on Sep. 14, 2010, both of which are hereby incorporated by reference in their entireties.

TECHNICAL FIELD

The present disclosure relates to the field of communication technologies, and in particular, to a method, device, and system for link aggregation failure protection.

BACKGROUND

A link aggregation group (Link Aggregation Group, LAG) is defined by an IEEE 802.3ad standard: Multiple Ethernet (Ethernet) links between two directly connected communication devices may form an aggregation relationship. FIG. 1 shows the case that two devices are connected through two Ethernet lines. Two physical ports on either of the two devices are bundled together to form one logical port. The two Ethernet links are aggregated into "one" logical link for the two devices. This provides convenience for high-layer protocol communication and traffic forwarding.

In the method for link aggregation failure protection in the prior art, as shown in FIG. 2, device 3 (Device3), device 4 (Device4), and device 5 (Device5) are all connected to two aggregation devices (AGG Device) AGG1 and AGG2, and forward data through the aggregation devices. Two physical links on device 3, device 4, and device 5 separately form an LAG. After an aggregation device receives a data packet sent by device 3, device 4, or device 5, the aggregation device looks up its own MAC address table according to the MAC (Media Access Control, MAC) address carried in the data packet and forwards data. Normally, the link between the two aggregation devices is in the closed state. When one physical link fails, for example, the link between device 4 and AGG1 fails, AGG1 sends all the data sent to device 4 to AGG2, and AGG2 forwards the data according to the media access control address, and sends the data to device 4.

In the prior art, the two aggregation devices need to notify each other of information about reachability of the MAC address so that normal forwarding of data may be ensured when a failure occurs. However, the MAC address table is a dynamic table and real-time learning and aging are required. Therefore, synchronization of MAC addresses of the two aggregation devices cannot be ensured, and thereby normal sending of data can hardly be ensured when the link fails.

SUMMARY

Embodiments of the present disclosure provide a method, device, and system for link aggregation failure protection, which are used to solve the problem in the prior art that normal sending of data can hardly be ensured when a link fails.

In one aspect, an embodiment of the present disclosure provides a method for link aggregation failure protection, including:

receiving failure information, where the failure information includes a failure location of a failed physical link and an identity of more than one corresponding logical link, the failed physical link and more than one physical link form a link aggregation group LAG, each physical link in the LAG corresponds to logical links with a same identity, and the logical links with the same identity in the LAG correspond to a telecom provider RSP device of a backbone layer and a receiving device of an access layer and forward data separately through more than two aggregation devices at an aggregation layer, where the aggregation layer is located between the backbone layer and the access layer;

according to the failure location and the identity of the more than one corresponding logical link, bundling a logical link corresponding to the failed physical link with a logical link corresponding to a physical link without failure in the LAG to form a logical link aggregation; and transmitting, through the logical link aggregation, data sent to the failed physical link.

In another aspect, an embodiment of the present disclosure provides an aggregation device, including:

a receiving module, configured to receive failure information, where the failure information includes a failure location of a failed physical link and an identity of more than one corresponding logical link, the failed physical link and more than one physical link form a link aggregation group LAG, each physical link in the LAG corresponds to logical links with a same identity, and the logical links with the same identity in the LAG correspond to a telecom provider RSP device of a backbone layer and a receiving device of an access layer and forward data separately through more than two aggregation devices at an aggregation layer, where the aggregation layer is located between the backbone layer and the access layer;

a bundling module, configured to bundle, according to the failure location and the identity of the more than one corresponding logical link, a logical link corresponding to the failed physical link with a logical link corresponding to a physical link without failure in the LAG to form a logical link aggregation; and a sending module, configured to transmit, through the logical link aggregation formed by the bundling module, data sent to the failed physical link.

An embodiment of the present disclosure further provides a system for link aggregation failure protection, including: at least two aggregation devices, where:

each of the aggregation devices is configured to: receive failure information sent by other aggregation devices, where the failure information includes a failure location of a failed physical link and an identity of more than one corresponding logical link, the failed physical link and more than one physical link form a link aggregation group LAG, each physical link in the LAG corresponds to logical links with a same identity, and the logical links with the same identity in the LAG correspond to a telecom provider RSP device of a backbone layer and a receiving device of an access layer and forward data separately through more than two aggregation devices at an aggregation layer, where the aggregation layer is located between the backbone layer and the access layer; according to the failure location, the identity of the more than one corresponding logical link, and a transmission direction, bundle a logical link corresponding to the failed physical link with a logical link corresponding to a physical link without failure in the LAG to form a logical link aggregation; and transmit, through the logical link aggregation, data sent to the failed physical link.

With the method, device, and system for link aggregation failure protection according to embodiments of the present disclosure, when failure information is received, according to the failure location and the identity of the corresponding logical link in the failure information, a logical link corresponding to the failed physical link is bundled with a logical link corresponding to a physical link without failure in the LAG to form a logical link aggregation for transmitting data. In the embodiments of the present disclosure, data does not need to be forwarded according to the MAC address, and instead, the data is forwarded directly according to the identity of the logical link, thereby ensuring normal transmission of data in the LAG.

DETAILED DESCRIPTION

The technical solution of the present disclosure is hereinafter described in detail with reference to the accompanying drawings and embodiments.

Figure 1:
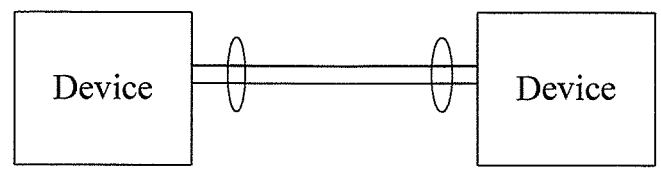
FIG. 1 is a schematic structural diagram of a link aggregation group in the prior art.
Figure 2:
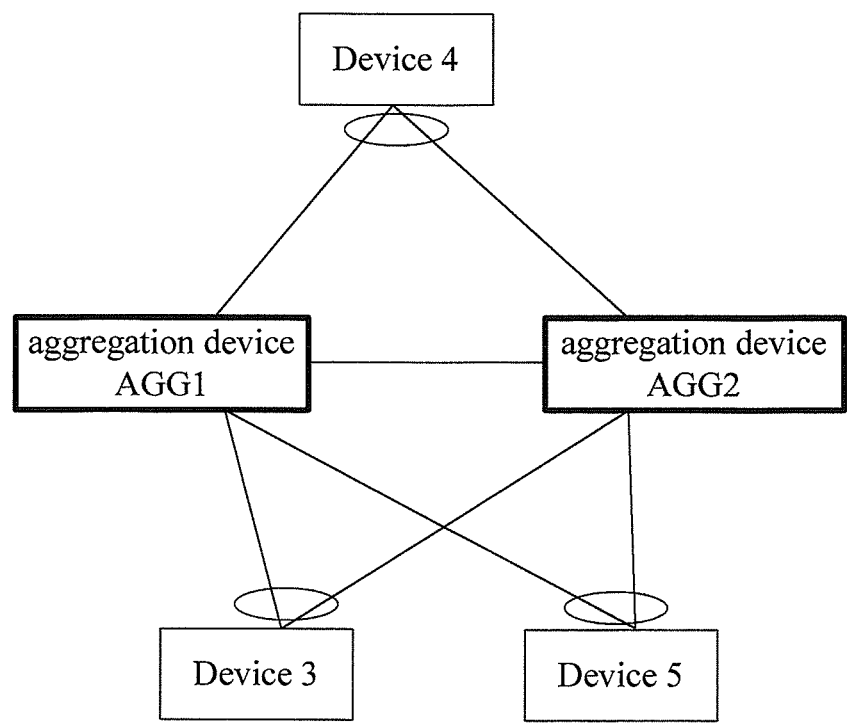
FIG. 2 is a schematic diagram of a network topology in the prior art.
Figure 3:
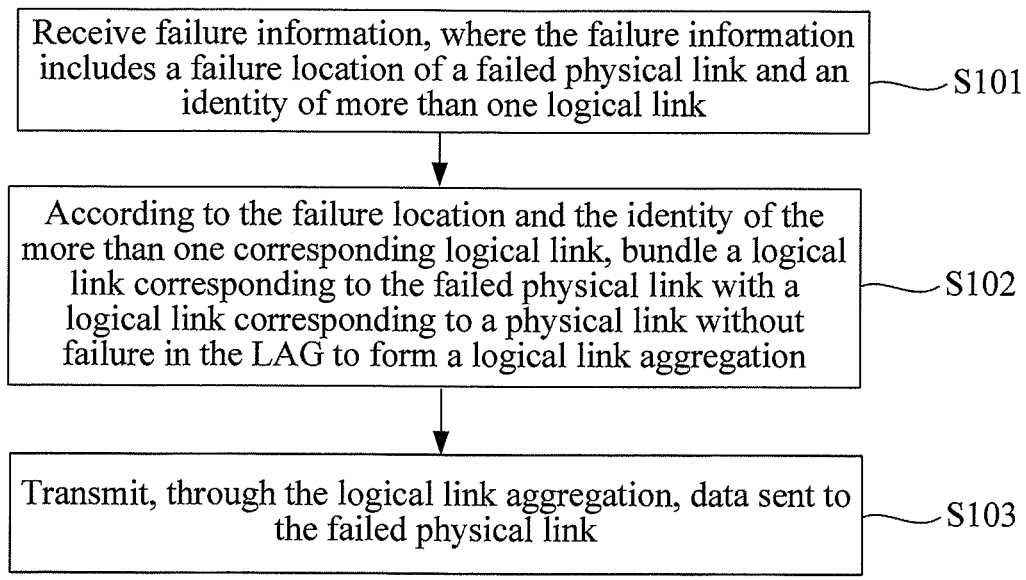
FIG. 3 is a flowchart of a first embodiment of a method for link aggregation failure protection provided in the present disclosure.

FIG. 3 is a flowchart of a first embodiment of a method for link aggregation failure protection provided in the present disclosure. As shown in FIG. 3, the method includes:

S101. Receive failure information, where the failure information includes a failure location of a failed physical link and an identity of more than one corresponding logical link, the failed physical link and more than one physical link form a link aggregation group LAG, each physical link in the LAG corresponds to logical links with a same identity, and the logical links with the same identity in the LAG correspond to a telecom provider RSP device of a backbone layer and a receiving device of an access layer, and forward data separately through more than two aggregation devices at an aggregation layer, where the aggregation layer is located between the backbone layer and the access layer.

The backbone layer includes multiple telecom provider (Retail Service Provider, RSP) devices, where the RSP devices may belong to different telecom providers, or may also belong to the same telecom provider. The access layer includes multiple access devices (Access Devices), and the aggregation layer is located between the backbone layer and the access layer and includes multiple aggregation devices (Aggregation Devices, AGG Devices), where the aggregation devices usually may be routers (Routers) or Ethernet switches (LAN Switches).

Figure 4:
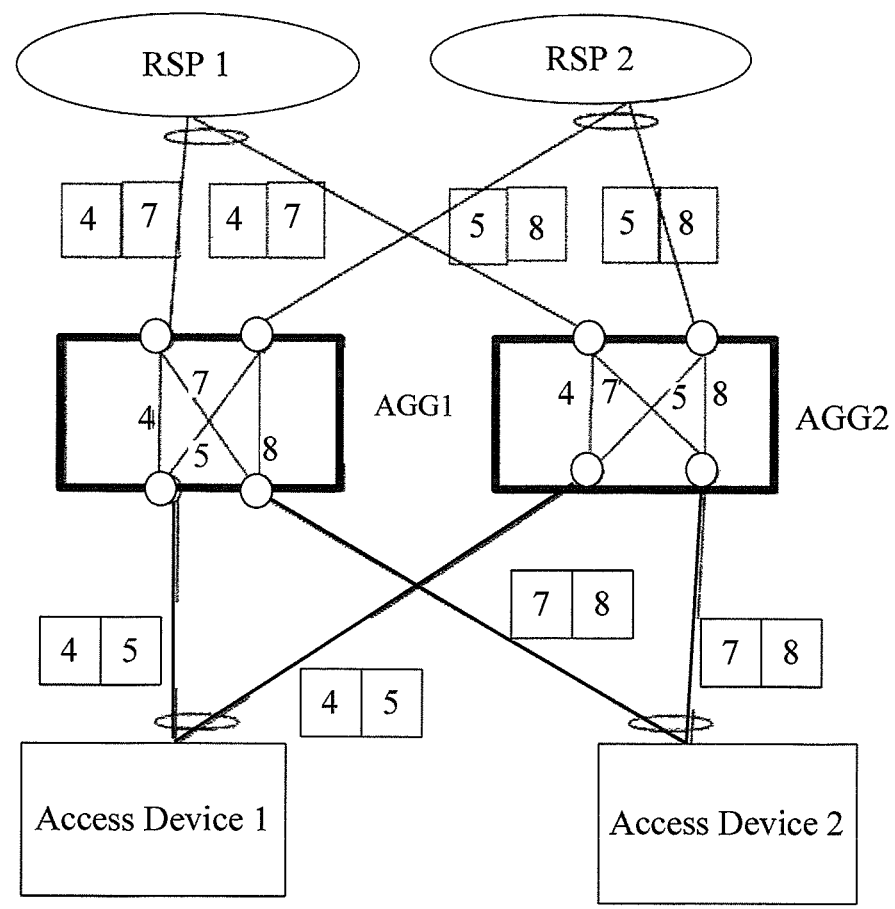
FIG. 4 is a structural diagram of a network topology of a cross-connect LAG provided in an embodiment of the present disclosure.

The following takes FIG. 4 as an example for description. FIG. 4 shows a structural diagram of a network topology of a cross-connect LAG involved in the method for link aggregation failure protection provided in an embodiment of the present disclosure. In FIG. 4, the backbone layer has two RSP devices: RSP1 and RSP2; the access layer has two access devices: Access Device1 and Access Device2; the aggregation layer has two aggregation devices: AGG1 and AGG2. But, the present disclosure is not limited thereto. Actually, each of the backbone layer, access layer, and aggregation layer may have multiple devices.

As shown in FIG. 4, each of RSP1 and RSP2 of the backbone layer has two physical links, which are connected to AGG1 and AGG2 separately; two physical links of each of RSP1 and RSP2 form an LAG. In each LAG, each LAG may be divided into multiple logical links logically by carrying a specified identity (Identity, ID) in the packet header of a transmitted data packet. For example, the LAG formed by a physical link between RSP1 and AGG1 and a physical link between RSP1 and AGG2 may be logically divided into two logical links with identity 4 and identity 7. Therefore, in the LAG formed by RSP1, each physical link may be logically divided into two logical links with identity 4 and identity 7. That is, the physical link between RSP1 and AGG1 may be logically divided into two logical links with identity 4 and identity 7, and the physical link between RSP1 and AGG2 may be logically divided into two logical links with identity 4 and identity 7.

In the LAG, logical links with the same identity correspond to an RSP device and an access device, and forward data through more than two aggregation devices. In FIG. 4, the logical link with identity 4 corresponds to RSP1 and Access Device1, that is, the identity of the data packet transmitted between RSP1 and Access Device1 is 4, and the logical link forwards data through AGG1 and AGG2 separately; the logical link with identity 7 corresponds to RSP1 and Access Device2, that is, the identity of the data packet transmitted between RSP1 and Access Device2 is 7, and the logical link forwards data through AGG1 and AGG2 separately.

Therefore, the data packet transmitted between RSP1 and Access Device1, namely, the data packet with identity 4, and the data packet transmitted between RSP1 and Access Device2, namely, the data packet with identity 7, are forwarded through AGG1 and AGG2 respectively; likewise, the data packet transmitted between RSP2 and Access Device1, namely, the data packet with identity 5, and the data packet transmitted between RSP2 and Access Device2, namely, the data packet with identity 8, are forwarded through AGG1 and AGG2 respectively.

Similar to the RSP at the backbone layer, each access device also has two physical links, which are separately connected to AGG1 and AGG2 to form respective LAGS. The physical link between Access Device1 and AGG1 and the physical link between Access Device1 and AGG2 may also be logically divided into two logical links with identity 4 and identity 5. The logical link with identity 4 corresponds to Access Device1 and RSP1 and forwards data through AGG1 and AGG2 separately; the logical link with identity 5 corresponds to Access Device1 and RSP2 and forwards data through AGG1 and AGG2 separately.

Likewise, the physical link between Access Device2 and AGG1 and the physical link between Access Device2 and AGG2 may also be logically divided into two logical links with identity 7 and identity 8. The logical link with identity 7 corresponds to Access Device2 and RSP1 and forwards data through AGG1 and AGG2 separately; the logical link with identity 8 corresponds to Access Device2 and RSP2 and forwards data through AGG1 and AGG2 separately.

As seen from the above description, the data transmitted between the backbone layer and the access layer is transparently transmitted through more than two aggregation devices separately in a cross-connect way, forming the cross-connect LAG shown in FIG. 4.

S102. According to the failure location and the identity of the more than one corresponding to the logical link, bundle a logical link corresponding to the failed physical link with a logical link corresponding to a physical link without failure in the LAG to form a logical link aggregation.

S103. Transmit, through the logical link aggregation, data sent to the failed physical link.

After a physical link fails, for example, the physical link between RSP1 and AGG1 in FIG. 3 fails, the aggregation device AGG1 connected to the failed physical link sends failure information to the other aggregation device AGG2 through a connection channel between the aggregation devices, where the failure information includes the failure location (between RSP1 and AGG1) of the failed physical link and the identities (identity 4 and identity 7) of corresponding logical links, so as to forward traffic that should be sent to the failed physical link to AGG2, and trigger AGG2 to receive the forwarded traffic.

The other aggregation device AGG2 receives the failure information sent by AGG1 from the connection channel between the aggregation devices, where the information includes identities (identity 4 and identity 7) of logical links corresponding to the failed physical link. Since the physical link between AGG2 and RSP1, and the failed physical link form an LAG, while the physical link also may be logically divided into two logical links with identity and identity 7, and since the logical link with identity 4 corresponds to RSP1 and Access Device1, and the logical link with identity 7 corresponds to RSP1 and Access Device2, AGG2 bundles the logical links with identity 4 and identity 7 corresponding to the failed physical link with the logical links, with identity 4 and identity 7 corresponding to the physical link without failure connected to AGG2 respectively, to form a logical link aggregation with identity 4 and a logical link aggregation with identity 7. In addition, since the failure information received by AGG2 further includes the failure location of the failed physical link, AGG2 may bundle, according to the failure location, the logical link sending data to the failed physical link.

After bundling the logical link, AGG2 transmits the traffic forwarded by AGG1, namely, the data sent to the failed physical link, to RSP1 through the logical link aggregation formed after the bundling.

With the method for link aggregation failure protection provided in the embodiment, when failure information is received, according to the failure location and the identity of the corresponding logical link in the failure information, the logical link corresponding to the failed physical link is bundled with the logical link corresponding to a physical link without failure in the LAG to form a logical link aggregation for transmitting data. In the method embodiment, data does not need to be forwarded according to the MAC address. Therefore, the problem of learning and aging of the MAC address does not exist. Since the logical links with the same identity correspond to an RSP and an access device, data may be forwarded directly according to the identity of the logical links, thereby ensuring normal transmission of data in the LAG.

Figure 5:
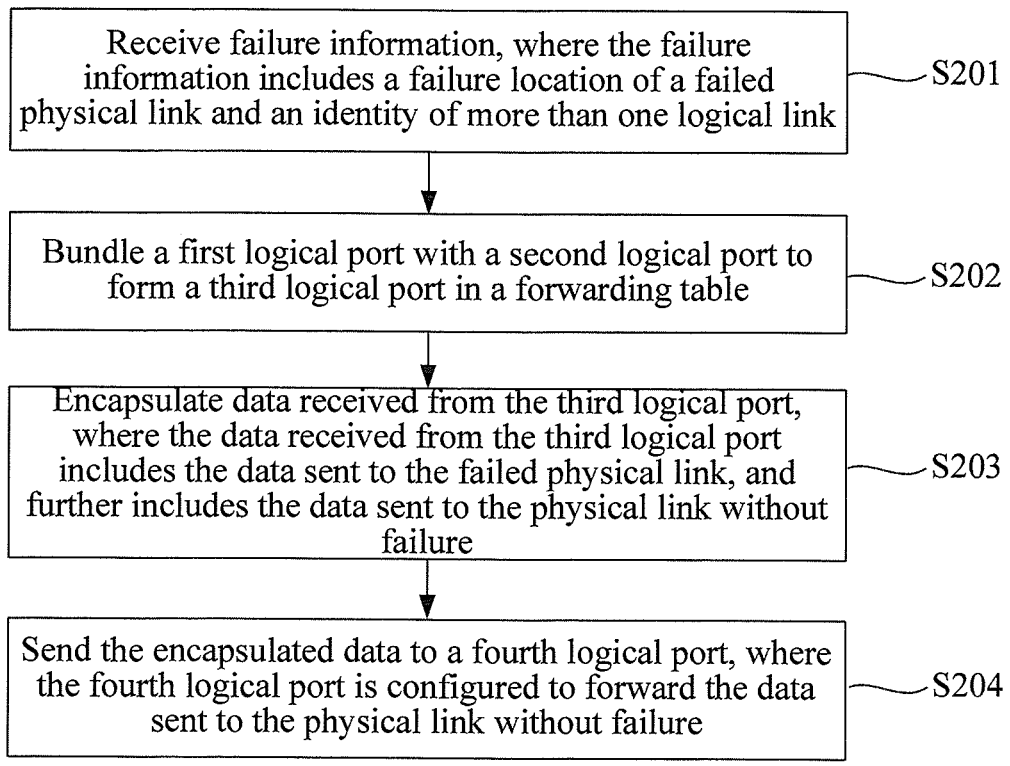
FIG. 5 is a flowchart of a second embodiment of a method for link aggregation failure protection provided in the present disclosure.

FIG. 5 is a flowchart of a second embodiment of a method for link aggregation failure protection provided in the present disclosure. As shown in FIG. 5, on the basis of the previous embodiment, the method for link aggregation failure protection may specifically include:

S201. Receive failure information, where the failure information includes a failure location of a failed physical link and an identity of more than one corresponding logical link, the failed physical link and more than one physical link form a link aggregation group LAG, and each physical link in the LAG corresponds to logical links with a same identity. The logical links with the same identity in the LAG correspond to an RSP device of a backbone layer and a receiving device of an access layer and forward data separately through more than two aggregation devices at an aggregation layer, where the aggregation layer is located between the backbone layer and the access layer.

S202. Bundle a first logical port with a second logical port to form a third logical port in a forwarding table, where the first logical port is configured to receive data sent to the failed physical link, and the second logical port is configured to receive data sent to the physical link without failure.

If the location of the failed physical link is located between the backbone layer and the aggregation layer, the logical link that is located between the access layer and the aggregation layer and corresponds to the failed physical link, is bundled with the logical link that is located between the access layer and the aggregation layer and corresponds to the physical link without failure; if the failure location of the failed physical link is located between the access layer and the aggregation layer, the logical link that is located between the backbone layer and the aggregation layer and corresponds to the failed physical link is bundled with the logical link that is located between the backbone layer and the aggregation layer and corresponds to the physical link without failure.

Figure 6:
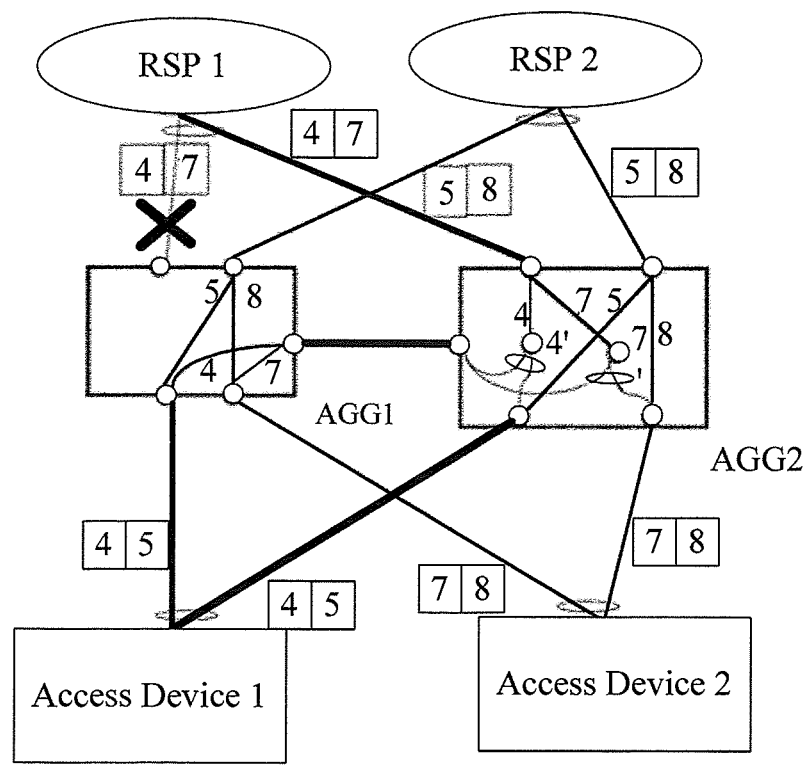
FIG. 6 is a structural diagram of a network topology shown in FIG. 3 after bundling of logical links.

Specifically, taking the case shown in FIG. 6 as an example, FIG. 6 is a structural diagram of a network topology shown in FIG. 3 after bundling of logical links. In FIG. 6, the location of the failed physical link is located between the backbone layer and the aggregation layer, and specifically, the physical link between RSP1 and AGG1 fails.

The physical links between RSP1 and AGG1 and between RSP1 and AGG2 are aggregated into one LAG, where the LAG may be divided into logical link 4 and logical link 7 according to transmitted data packets of different IDs. The logical link with identity 4 corresponds to RSP1 and Access Device1, that is, the identity of the data packet transmitted between RSP1 and Access Device1 is 4, and the logical link with identity 7 corresponds to RSP1 and Access Device2, that is, the identity of the data packet transmitted between RSP1 and Access Device2 is 7.

It should be noted that, the logical link may have different identities in different network segments, for example, the identity of the logical link with identity 4 between RSP1 and Access Device1 may be 4' in the network segment from RSP1 to AGG1, and may be 4 in the network segment from AGG1 to Access Device1. The existing aggregation device may identify the identity.

When the physical link between RSP1 and AGG1 fails, AGG1 sends failure information to AGG2 first through the connection channel between the aggregation devices; then AGG 1 forwards all traffic sent to the failed physical link to AGG2 through the connection channel between the aggregation devices, while the failure information is used to inform AGG2 of the failure location and the identity of the logical link corresponding to the failed physical link, so as to trigger AGG2 to receive the forwarded traffic and bundle the logical links.

The bundling of the logical links is actually bundling logical ports. Bundling the first logical port with the second logical port to form a third logical port in the forwarding table, is specifically as follows:

In AGG2, a physical port connected to Access Device1 exists, where the physical port may transmit the data packet with ID 4. Therefore, the physical port may be regarded as a logical port with identity 4.

AGG2 receives, from the port (namely, the first logical port) connected to AGG 1, the traffic sent to the logical link with identity 4 corresponding to the failed physical link; AGG2 receives, from the logical port (namely, the second logical port) with identity 4 connected to Access Device1, the traffic sent to the logical link with identity 4 corresponding to the physical link without failure in the LAG. AGG2 bundles the first logical port with the second logical port to form a third logical port 4' in the forwarding entry of AGG2.

Likewise, AGG2 receives, from the port (namely, the first logical port) connected to AGG 1, the traffic sent to the logical link with identity 7 corresponding to the failed physical link; AGG2 receives, from the logical port (namely, the second logical port) with identity 2 connected to Access Device2, the traffic sent to the logical link with identity 2 corresponding to the physical link without failure in the LAG. AGG2 bundles the first logical port with the second logical port to form a third logical port 7' in the forwarding entry of AGG2.

After the logical ports are bundled, the traffic sent to the failed physical link in the LAG of RSP1 and the traffic sent to the physical link without failure in the LAG are all received through the third logical ports (namely, 4' and 7'), so that the traffic sent to the failed physical link may be normally sent through the third logical port formed after bundling.

S203. Encapsulate data received from the third logical port, where the data received from the third logical port includes the data sent to the failed physical link, and further includes the data sent to the physical link without failure.

S204. Send the encapsulated data to a fourth logical port, where the fourth logical port is configured to forward the data sent to the physical link without failure.

The data received from the third logical port includes: the traffic sent to the failed physical link in the LAG of RSP1, and the traffic sent to the physical link without failure in the LAG.

AGG2 also has a physical port connected to RSP1, where the physical port may transmit the data packets with ID 4 and ID 7. Therefore, the physical port may be regarded as a logical port with identity 4 and a logical port with identity 7.

After AGG2 receives data from the third logical port, AGG2 encapsulates the data, and specifically, may perform multi-protocol label switching (Multi-Protocol Label Switching, MPLS) encapsulation, or carry new IDs in the packet headers of the data packets.

After encapsulation, AGG2 sends the encapsulated data to the physical port (fourth logical port) connected to RSP1. This physical port is called the fourth logical port because the physical port may actually be regarded as a logical port with identity 4 and a logical port with identity 7. The encapsulated data is sent to RSP1 through the fourth logical port.

The above data encapsulation process may be regarded as a process of establishing an internal channel for the logical link with identity 4 between RSP1 and AGG2 and the logical link with identity 4 between AGG2 and Access Device1 inside AGG2. The above data encapsulation process also includes the process of establishing an internal channel for the logical link with identity 7 between RSP1 and AGG2 and the logical link with identity 7 between AGG2 and Access Device2 inside AGG2. After the logical channel is established inside AGG2, AGG2 may be considered to have logical channel 4 and logical channel 7. The data received from logical port 4' is sent to RSP1 directly through the internal logical channel 4, and the data received from logical port 7' is sent to RSP1 directly through the internal logical channel 7.

Likewise, logical channel 5 and logical channel 8 may also be established inside AGG2; or logical channels 4, 5, 7, and 8 may also be established separately in AGG1 by means of data encapsulation.

The internal logical channel is established, so that the aggregation device does not need to forward data according to MAC address, and thereby the problem of learning and aging of the MAC address does not exist.

Taking RSP1 as an example, the actual communication peer of RSP1 is Access Device1 and Access Device2. RSP1 sends data to the actual communication peer Access Device1 through two logical links actually. One logical link is: a logical link with identity 4 from RSP1 to AGG1, an internal direct channel 4 of AGG1, and a logical link with identity 4 from AGG1 to Access Device1 in sequence; the other logical link is: a logical link with identity 4 from RSP1 to AGG2, an internal direct channel 4 of AGG2, and a logical link with identity 4 from AGG2 to Access Device1 in sequence. RSP1 sends data to the actual communication peer Access Device2 through two logical links actually. One logical link is: a logical link with identity 7 from RSP1 to AGG1, an internal direct channel 7 of AGG1, and a logical link with identity 7 from AGG1 to Access Device2 in sequence; the other logical link is: a logical link with identity 7 from RSP1 to AGG2, an internal direct channel 7 of AGG2, and a logical link with identity 7 from AGG2 to Access Device2 in sequence. That is, the data sent by RSP1 to Access Device1 and Access Device2 is transparently transmitted to Access Device1 and Access Device2 in a cross-connect way through the internal logical channels of AGG1 and AGG2.

Actually, both the backbone layer and the access layer may include multiple devices, and the aggregation layer may also include multiple aggregation devices. The aggregation devices may work in pairs, and transparently transmit the data sent by any RSP device at the backbone layer to the access device at the access layer in a cross-connect way, or transparently transmit the data sent by any access device at the access layer to multiple RSP devices at the backbone layer in a cross-connect way, forming multipoint-to-multipoint data transmission between the backbone layer and the access layer.

Figure 7:
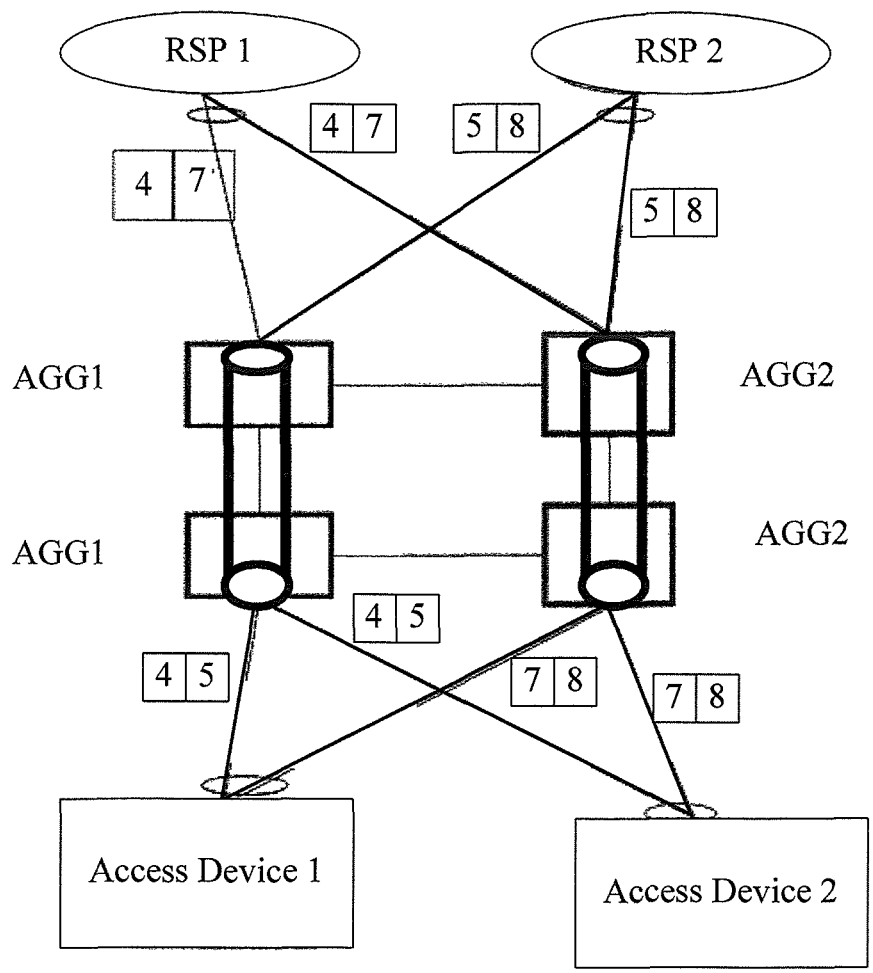
FIG. 7 is a schematic diagram of a network topology in which an aggregation layer in a network topology in FIG. 3 includes two aggregation sublayers.

In addition, it should be noted that the aggregation layer may be formed by more than two aggregation sublayers. FIG. 7 shows a case that the aggregation layer includes two aggregation sublayers. Each aggregation sublayer includes multiple aggregation devices, and one aggregation device at each aggregation sublayer and the corresponding aggregation devices in other aggregation sublayers form a whole for forwarding data. Among the aggregation devices at each aggregation sublayer, the same logical links are only needed to be connected.

In the method for link aggregation failure protection provided in the embodiment, when failure information is received, according to the failure location and the identity of the corresponding logical link in the failure information, the logical link corresponding to the failed physical link is bundled with the logical link corresponding to a physical link without failure in the LAG to form a logical link aggregation for transmitting data. In the method embodiment, inside the aggregation device, logical channels are established for logical links of each network segment by using methods such as data encapsulation. Therefore, data does not need to be forwarded according to the MAC address, the problem of learning and aging of the MAC address does not exist, and the data only needs to be forwarded according to the identity of the logical link, thereby ensuring normal transmission of data in the LAG.

In the above two embodiments of the method for link aggregation failure protection, when a physical link fails, the logical link corresponding to the failed physical link is bundled with the logical link corresponding to the physical link without failure in the LAG to form a logical link aggregation for transmitting data.

Figure 8:
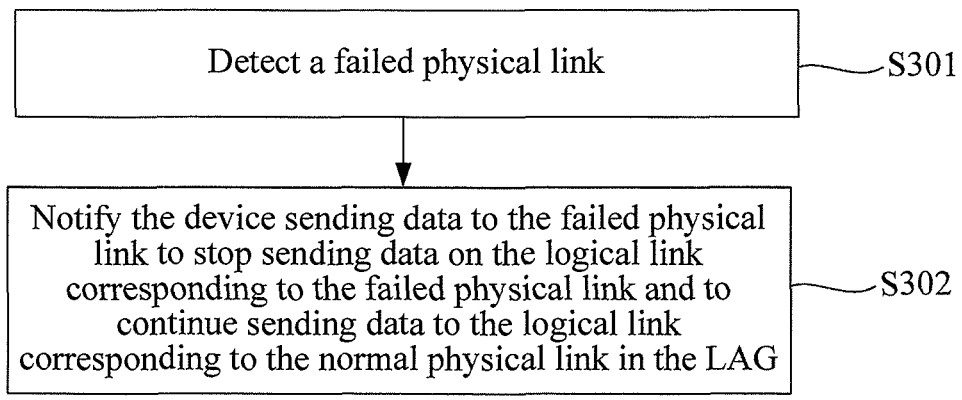
FIG. 8 is a flowchart of a third embodiment of a method for link aggregation failure protection provided in the present disclosure.

FIG. 8 is a flowchart of a third embodiment of a method for link aggregation failure protection provided in the present disclosure. The method for link aggregation failure protection provided in the embodiment includes:

S301. Detect a failed physical link, where the failed physical link and more than one physical link form a link aggregation group LAG, each physical link in the LAG corresponds to logical links with a same identity, and the logical links with the same identity in the LAG correspond to an RSP device of a backbone layer and a receiving device of an access layer and forward data separately through more than two aggregation devices at an aggregation layer, where the aggregation layer is located between the backbone layer and the access layer.

The backbone layer includes multiple RSP devices; the access layer includes multiple access devices; the aggregation layer is located between the backbone layer and the access layer, and includes multiple aggregation devices AGG Devices, where the aggregation devices usually may be routers or Ethernet switches (LAN Switches).

For the structural diagram of the network topology of the cross-connect LAG involved in the method for link aggregation failure protection provided in the embodiment, reference may be made to FIG. 4 and the related description in the first embodiment of the method for link aggregation failure protection, which is not further described herein.

S302. Notify the device sending data to the failed physical link to stop sending data on the logical link corresponding to the failed physical link and to continue sending data to the logical link corresponding to the physical link without failure in the LAG.

Figure 9:
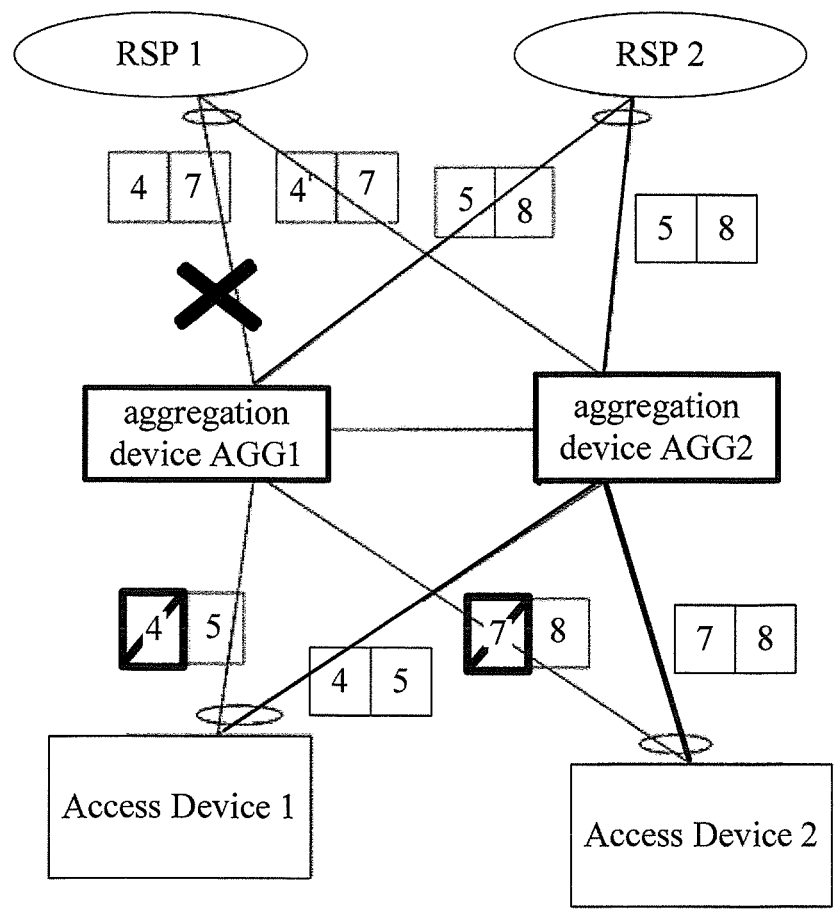
FIG. 9 is a structural diagram of a network topology of a cross-connect LAG in an embodiment shown in FIG. 8.

Referring to FIG. 9, description is provided by using an example in which the physical link between RSP1 and AGG1 at the first communication layer fails. In one aspect, the failed physical link may be logically divided into a logical link with identity 4 and a logical link with identity 7 according to the ID number of a transmitted data packet, while another physical link (a physical link from RSP1 to AGG2), which forms an LAG with the failed physical link, may also be divided into a logical link with identity 4 and a logical link with identity 7.

Because devices sending traffic to the failed physical link include Access Device1 and Access Device2, Access Device1 sends traffic to the failed physical link through the logical link with identity 4 from Access Device1 to AGG1, and Access Device2 sends traffic to the failed physical link through the logical link with identity 7 from Access Device2 to AGG1. Therefore, after AGG1 detects a failed physical link, AGG1 notifies Access Device1 and Access Device2 to stop sending data to the logical link with identity 4 from Access Device1 to AGG1 and the logical link with identity 7 from Access Device2 to AGG1 respectively, but because AGG2 does not initiate a notification to Access Device1 and Access Device2, Access Device1 may still send traffic to the failed physical link through the logical link with identity 4 from Access Device1 to AGG2, and Access Device2 may send traffic to the failed physical link through the logical link with identity 7 from Access Device2 to AGG2. This ensures smooth communication of the logical link with identity 4 between Access Device1 and RSP1 and the logical link with identity 7 between Access Device2 and RSP1. It can be seen that, the method may achieve the following effect: In the LAG, the logical link corresponding to the failed physical link does not transmit data, while the logical link corresponding to the physical link without failure continues transmitting data.

In another aspect, the physical link between Access Device1 and AGG1 includes a logical link with identity 5 in addition to the logical link with identity 4, where the logical link with identity 5 corresponds to Access Device1 and RSP2; likewise, the physical link between Access Device2 and AGG1 includes a logical link with identity 8 in addition to the logical link with identity 7, where the logical link with identity 8 corresponds to Access Device2 and RSP2. AGG1 notifies Access Device1 to stop sending data on the logical link with identity 4 corresponding to the physical link between Access Device1 and AGG1 but to continue sending data on the logical link with identity 5; likewise, AGG1 notifies Access Device2 to stop sending data on the logical link with identity 7 corresponding to the physical link between Access Device2 and AGG1 but to continue sending data on the logical link with identity 8. It can be seen that, the physical link between Access Device1 and AGG1 corresponds to the logical link with identity 4 and the logical link with identity 5; the physical link between Access Device2 and AGG1 corresponds to the logical link with identity 7 and the logical link with identity 8. This method may also achieve the following effect: One logical link corresponding to a physical link sends data, and another corresponding logical link stops sending data.

With the method for link aggregation failure protection provided in the embodiment of the present disclosure, when the physical link between the RSP device of the backbone layer and the aggregation device of the aggregation layer and/or between the access device of the access layer and the aggregation device of the aggregation layer fails, the aggregation device connected to the failed physical link notifies the device sending data to the failed physical link to stop sending traffic on the logical link corresponding to the failed physical link but to continue sending traffic on the logical link corresponding to the physical link without failure in the LAG. The method embodiment, in one aspect, may achieve the effect that the logical link corresponding to the failed physical link does not transmit data in the LAG, while the logical link corresponding to the physical link without failure continues transmitting data; and in another aspect, may achieve the effect that one logical link corresponding to a physical link sends data, and another corresponding logical link stops sending data. In the method embodiment, data does not need to be forwarded according to the MAC address. Therefore, the problem of learning and aging of the MAC address does not exist. Because the logical links with the same identity correspond to an RSP device and an access device, data may be forwarded directly according to the identity of the logical links, thereby ensuring normal transmission of data in the LAG.

In the third embodiment of the method for link aggregation failure protection, the notification initiated by the aggregation device may be carried in the protocol pre-created between the backbone layer and the access layer, or may be carried by configuring an existing protocol between the backbone layer and the access layer.

Persons of ordinary skill in the art may understand that all or part of the steps in the method according to the embodiments may be implemented by hardware under the instruction of a program. The program may be stored in a computer readable storage medium and when the program runs, the steps in the method according to the embodiments are executed. The storage medium is any medium that may store program codes, such as a ROM, a RAM, a magnetic disk, or a CD-ROM.

Figure 10:
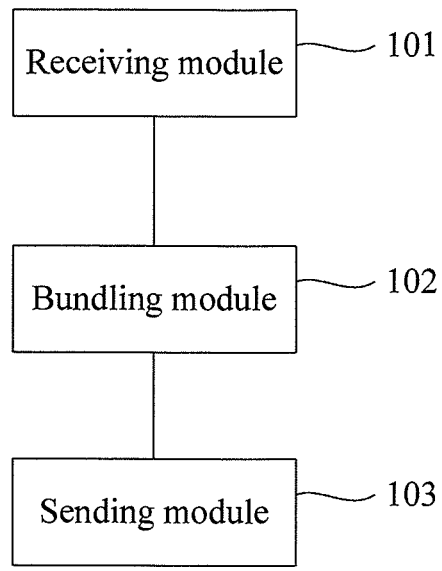
FIG. 10 is a schematic structural diagram of a first embodiment of an aggregation device provided in the present disclosure.

FIG. 10 is a schematic structural diagram of a first embodiment of an aggregation device provided in the present disclosure. Referring to FIG. 10, the aggregation device includes: a receiving module 101, a bundling module 102, and a sending module 103.

The receiving module 101 is configured to receive failure information, where the failure information includes a failure location of a failed physical link and an identity of more than one corresponding logical link, the failed physical link and more than one physical link form a link aggregation group LAG, each physical link in the LAG corresponds to logical links with a same identity, and the logical links with the same identity in the LAG correspond to an RSP device of a backbone layer and a receiving device of an access layer and forward data separately through more than two aggregation devices at an aggregation layer, where the aggregation layer is located between the backbone layer and the access layer.

The bundling module 102 is configured to bundle, according to the failure location and the identity of the more than one corresponding logical link, a logical link corresponding to the failed physical link with a logical link corresponding to a physical link without failure in the LAG to form a logical link aggregation.

The sending module 103 is configured to transmit, through the logical link aggregation formed by the bundling module 102, data sent to the failed physical link.

With the aggregation device provided in the embodiment, when failure information is received, according to the failure location and the identity of the corresponding logical link in the failure information, the logical link corresponding to the failed physical link is bundled with the logical link corresponding to the physical link without failure in the LAG to form a logical link aggregation for transmitting data. In the device embodiment, data does not need to be forwarded according to the MAC address. Therefore, the problem of learning and aging of the MAC address does not exist. Because the logical links with the same identity correspond to an RSP device and an access device, data may be forwarded directly according to the identity of the logical links, thereby ensuring normal transmission of data in the LAG.

Figure 11:
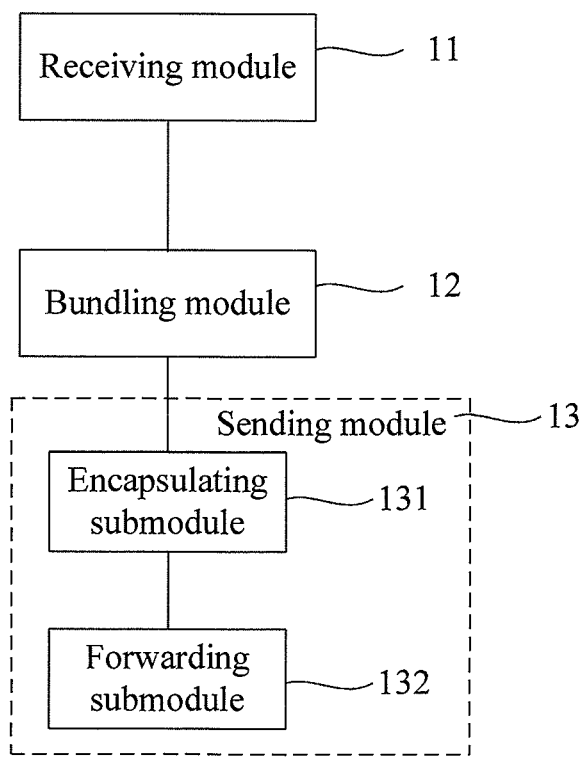
FIG. 11 is a schematic structural diagram of a second embodiment of an aggregation device provided in the present disclosure.

FIG. 11 is a schematic structural diagram of a second embodiment of an aggregation device provided in the present disclosure. Referring to FIG. 11, the aggregation device includes: a receiving module 11, a bundling module 12, and a sending module 13.

The receiving module 11 is configured to receive failure information, where the failure information includes a failure location of a failed physical link and an identity of more than one corresponding logical link, the failed physical link and more than one physical link form a link aggregation group LAG, each physical link in the LAG corresponds to logical links with a same identity, and the logical links with the same identity in the LAG correspond to a telecom provider RSP device of a backbone layer and a receiving device of an access layer and forward data separately through more than two aggregation devices at an aggregation layer, where the aggregation layer is located between the backbone layer and the access layer.

The bundling module 12 is configured to bundle, according to the failure location and the identity of the more than one corresponding logical link, a logical link corresponding to the failed physical link with a logical link corresponding to a physical link without failure in the LAG to form a logical link aggregation.

The sending module 13 is configured to transmit, through the logical link aggregation formed by the bundling module 12, data sent to the failed physical link.

Further, if the failure location is located between the backbone layer and the aggregation layer, the bundling module 12 may be specifically configured to: bundle the logical link that is located between the access layer and the aggregation layer and corresponds to the failed physical link with the logical link that is located between the access layer and the aggregation layer and corresponds to the physical link without failure.

Alternatively, if the failure location is located between the access layer and the aggregation layer, the bundling module 12 may be further specifically configured to: bundle the logical link that is located between the backbone layer and the aggregation layer and corresponds to the failed physical link with the logical link that is located between the backbone layer and the aggregation layer and corresponds to the physical link without failure.

In addition, the bundling operation performed by the bundling module 12 is specifically: bundling a first logical port with a second logical port to form a third logical port in a forwarding table, where the first logical port is configured to receive data sent to the failed physical link, and the second logical port is configured to receive data sent to the physical link without failure.

The sending module 13 may further include: an encapsulating submodule 131 and a forwarding submodule 132.

The encapsulating submodule 131 is configured to encapsulate data received from the third logical port, where the data received from the third logical port includes the data sent to the failed physical link, and further includes the data sent to the physical link without failure.

The forwarding submodule 132 is configured to send the data encapsulated by the encapsulating submodule 131 to a fourth logical port, where the fourth logical port is configured to forward the data sent to the physical link without failure.

With the aggregation device provided in the embodiment of the present disclosure, when failure information is received, according to the failure location and the identity of the corresponding logical link in the failure information, the logical link corresponding to the failed physical link is bundled with the logical link corresponding to the physical link without failure in the LAG to form a logical link aggregation for transmitting data. In the device embodiment, inside the aggregation device, logical channels are established for logical links of each network segment by using methods such as data encapsulation. Therefore, data does not need to be forwarded according to the MAC address, the problem of learning and aging of the MAC address does not exist, and the data only needs to be forwarded according to the identity of the logical link, thereby ensuring normal transmission of data in the LAG.

Figure 12:
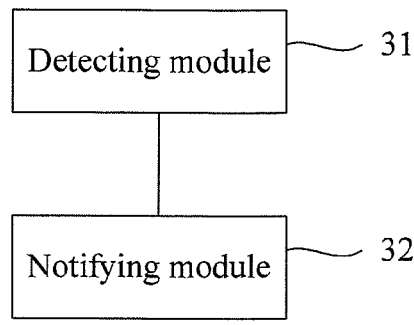
FIG. 12 is a schematic structural diagram of a third embodiment of an aggregation device provided in the present disclosure.

FIG. 12 is a schematic structural diagram of a third embodiment of an aggregation device provided in the present disclosure. Referring to FIG. 12, the aggregation device includes: a detecting module 31, and a notifying module 32.

The detecting module 31 is configured to detect a failed physical link, where the failed physical link and more than one physical link form a link aggregation group LAG, each physical link in the LAG corresponds to logical links with a same identity, and the logical links with the same identity in the LAG correspond to a telecom provider RSP device of a backbone layer and a receiving device of an access layer and forward data separately through more than two aggregation devices at an aggregation layer, where the aggregation layer is located between the backbone layer and the access layer.

The notifying module 32 is configured to notify the device sending data to the failed physical link to stop sending data on the logical link corresponding to the failed physical link and to continue sending data to the logical link corresponding to the physical link without failure in the LAG.

With the aggregation device provided in the embodiment, when the physical link between the RSP device of the backbone layer and the aggregation device of the aggregation layer and/or between the access device of the access layer and the aggregation device of the aggregation layer fails, the aggregation device connected to the failed physical link notifies the device sending data to the failed physical link to stop sending traffic on the logical link corresponding to the failed physical link but to continue sending traffic on the logical link corresponding to the physical link without failure in the LAG. The device embodiment, in one aspect, may achieve the effect that in the LAG, the logical link corresponding to the failed physical link does not transmit data while the logical link corresponding to the physical link without failure continues transmitting data; and in another aspect, may achieve the effect that one logical link corresponding to a physical link sends data, and another corresponding logical link stops sending data. In the device embodiment, data does not need to be forwarded according to the MAC address. Therefore, the problem of learning and aging of the MAC address does not exist. Because the logical links with the same identity correspond to an RSP device and an access device, data may be forwarded directly according to the identity of the logical links, thereby ensuring normal transmission of data in the LAG.

Figure 13:
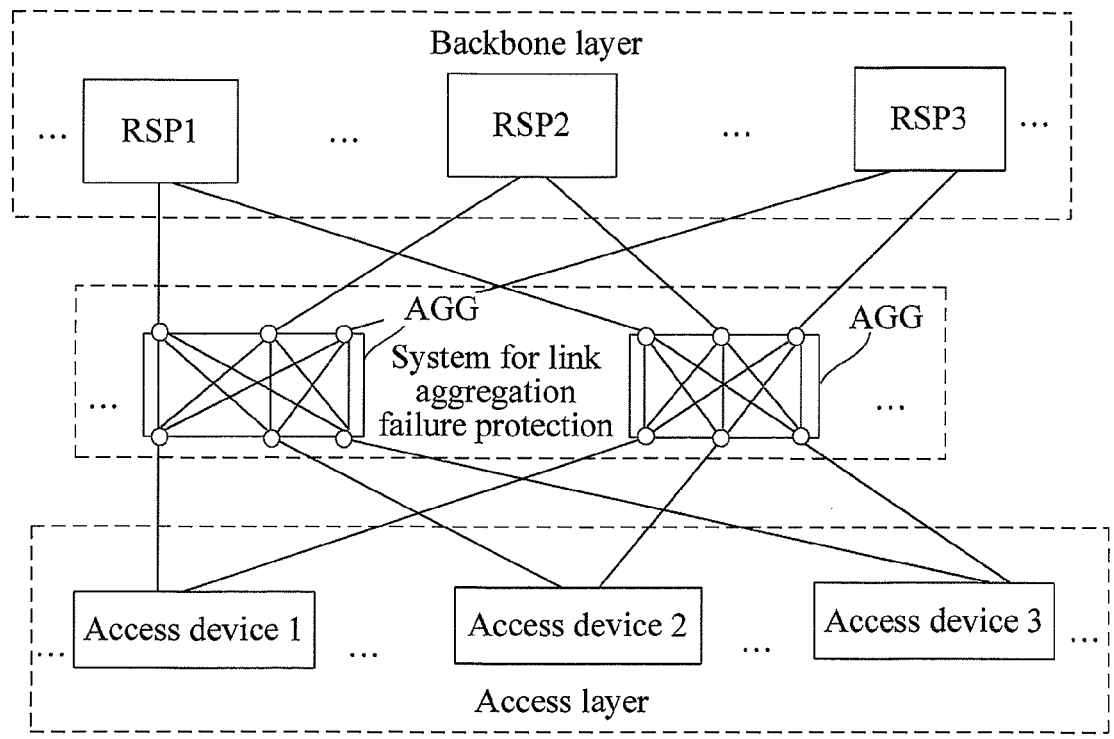
FIG. 13 is a schematic structural diagram of a first embodiment of a system for link aggregation failure protection provided in the present disclosure.

FIG. 13 is a schematic structural diagram of a first embodiment of a system for link aggregation failure protection provided in the present disclosure, where the system includes at least two aggregation devices 1.

Each aggregation device 1 is configured to: receive failure information sent by other aggregation devices 1, where the failure information includes a failure location of a failed physical link and an identity of more than one corresponding logical link, the failed physical link and more than one physical link form a link aggregation group LAG, each physical link in the LAG corresponds to logical links with a same identity, and the logical links with the same identity in the LAG correspond to a telecom provider RSP device of a backbone layer and a receiving device of an access layer and forward data separately through more than two aggregation devices 1 at an aggregation layer, where the aggregation layer is located between the backbone layer and the access layer; according to the failure location and the identity of the more than one corresponding logical link, bundle a logical link corresponding to the failed physical link with a logical link corresponding to a physical link without failure in the LAG to form a logical link aggregation; and transmit, through the logical link aggregation, data sent to the failed physical link.

With the system for link aggregation failure protection according to the embodiment of the present disclosure, when failure information is received, according to the failure location and the identity of the corresponding logical link in the failure information, the logical link corresponding to the failed physical link is bundled with the logical link corresponding to a physical link without failure in the LAG to form a logical link aggregation for transmitting data. In the system embodiment, data does not need to be forwarded according to the MAC address. Therefore, the problem of learning and aging of the MAC address does not exist. Because the logical links with the same identity correspond to an RSP device and an access device, data may be forwarded directly according to the identity of the logical links, thereby ensuring normal transmission of data in the LAG.

The system for link aggregation failure protection provided in the embodiment of the present disclosure corresponds to the method for link aggregation failure protection provided in the embodiment of the present disclosure, where, for all the network topology structures of the cross-connect LAG and related descriptions thereof involved in the embodiment of the aggregation device and the embodiment of the system for link aggregation failure protection, and the specific process of implementing link aggregation failure protection, reference may be made to the embodiment of the method for link aggregation failure protection.

The failure information in all the above embodiments of the present disclosure may also be sensed or detected by the device, which is not limited by the embodiments of the present disclosure.

Finally, it should be noted that the embodiments of the present disclosure are intended for describing the technical solution of the present disclosure other than limiting the present disclosure. Although the present disclosure is described in detail with reference to the foregoing embodiments, persons of ordinary skill in the art should understand that they can still make modifications to the technical solution described in the foregoing embodiments or make substitutions to some technical features thereof, without departing from the spirit and scope of the technical solution of the embodiments of the present disclosure. The method is applicable to information routing and forwarding performed by a routing node in other various wireless communication networks.

What is claimed is:

1. A method for link aggregation failure protection, the method comprising:
receiving failure information, wherein the failure information comprises a failure location of a failed physical link and an identity of more than one corresponding logical link, the failed physical link and more than one physical link form a link aggregation group (LAG), each physical link in the LAG corresponds to logical links with a same identity, and the logical links with the same identity in the LAG correspond to a telecom provider Retail Service provider (RSP) device of a backbone layer and a receiving device of an access layer and forward data separately through at least two aggregation devices at an aggregation layer, wherein the aggregation layer is located between the backbone layer and the access layer;
according to the failure location and the identity of the more than one corresponding logical link, bundling a logical link corresponding to the failed physical link with a logical link corresponding to a physical link without failure in the LAG to form a logical link aggregation; and
transmitting, through the logical link aggregation, data sent to the failed physical link;

wherein a first aggregation device coupled to the failed physical link sends the failure information to a second aggregation device, the second aggregation device performing, when the failure location is located between the access layer and the aggregation layer:
bundling a logical link that is located between the backbone layer and the aggregation layer and corresponds to the failed physical link with a logical link that is located between the backbone layer and the aggregation layer and corresponds to the physical link without failure.

2. The method according to claim 1, further comprising:
bundling a first logical port with a second logical port to form a third logical port in a forwarding table, wherein the first logical port is configured to receive data sent to the failed physical link, and the second logical port is configured to receive data sent to the physical link without failure.

3. The method according to claim 2, wherein transmitting, through the logical link aggregation, data sent to the failed physical link comprises:
encapsulating data received from the third logical port, wherein the data received from the third logical port comprises the data sent to the failed physical link, and further comprises the data sent to the physical link without failure; and
sending the encapsulated data to a fourth logical port, wherein the fourth logical port is configured to forward the data sent to the physical link without failure.

4. A method for link aggregation failure protection, the method comprising:
receiving failure information, wherein the failure information comprises a failure location of a failed physical link and an identity of more than one corresponding logical link, the failed physical link and more than one physical link form a link aggregation group (LAG), each physical link in the LAG corresponds to logical links with a same identity, and the logical links with the same identity in the LAG correspond to a telecom provider Retail Service provider (RSP) device of a backbone layer and a receiving device of an access layer and forward data separately through at least two aggregation devices at an aggregation layer, wherein the aggregation layer is located between the backbone layer and the access layer;
according to the failure location and the identity of the more than one corresponding logical link, bundling a logical link corresponding to the failed physical link with a logical link corresponding to a physical link without failure in the LAG to form a logical link aggregation; and
transmitting, through the logical link aggregation, data sent to the failed physical link;
wherein a first aggregation device coupled to the failed physical link sends the failure information to a second aggregation device, the second aggregation device performing:
bundling a first logical port with a second logical port to form a third logical port in a forwarding table, wherein the first logical port is configured to receive data sent to the failed physical link, and the second logical port is configured to receive data sent to the physical link without failure;
wherein transmitting, through the logical link aggregation, data sent to the failed physical link, comprises:
encapsulating data received from the third logical port, wherein the data received from the third logical port comprises the data sent to the failed physical link, and further comprises the data sent to the physical link without failure; and
sending the encapsulated data to a fourth logical port, wherein the fourth logical port is configured to forward the data sent to the physical link without failure.

5. The method according to claim 4, wherein, encapsulating data received from the third logical port comprises:
performing multi-protocol label switching MPLS encapsulation on the data received from the third logical port.

6. A method for link aggregation failure protection, the method comprising:
receiving failure information, wherein the failure information comprises a failure location of a failed physical link and an identity of more than one corresponding logical link, the failed physical link and more than one physical link form a link aggregation group (LAG), each physical link in the LAG corresponds to logical links with a same identity, and the logical links with the same identity in the LAG correspond to a telecom provider Retail Service provider (RSP) device of a backbone layer and a receiving device of an access layer and forward data separately through at least two aggregation devices at an aggregation layer, wherein the aggregation layer is located between the backbone layer and the access layer;
according to the failure location and the identity of the more than one corresponding logical link, bundling a logical link corresponding to the failed physical link with a logical link corresponding to a physical link without failure in the LAG to form a logical link aggregation; and
transmitting, through the logical link aggregation, data sent to the failed physical link;
wherein a first aggregation device coupled to the failed physical link sends the failure information to a second aggregation device, the second aggregation device performing, when the failure location is between the backbone layer and the aggregation layer:
bundling a first logical port with a second logical port to form a third logical port in a forwarding table, wherein the first logical port is configured to receive data sent to the failed physical link, and the second logical port is configured to receive data sent to the physical link without failure;
wherein transmitting, through the logical link aggregation, data sent to the failed physical link, comprises:
encapsulating data received from the third logical port, wherein the data received from the third logical port comprises the data sent to the failed physical link, and further comprises the data sent to the physical link without failure; and
sending the encapsulated data to a fourth logical port, wherein the fourth logical port is configured to forward the data sent to the physical link without failure.

7. An aggregation device, comprising a processor and a memory, wherein the memory stores one or more instructions for instructing the processor to perform the steps of:
receiving failure information, wherein the failure information comprises a failure location of a failed physical link and an identity of more than one corresponding logical link, the failed physical link and more than one physical link form a link aggregation group (LAG), each physical link in the LAG corresponds to logical links with a same identity, and the logical links with the same identity in the LAG correspond to a telecom provider Retail Service provider (RSP) device of a backbone layer and a receiving device of an access layer and forward data separately through at least two aggregation devices at an aggregation layer, wherein the aggregation layer is located between the backbone layer and the access layer;

bundling, according to the failure location and the identity of the more than one corresponding logical link, a logical link corresponding to the failed physical link with a logical link corresponding to a physical link without failure in the LAG to form a logical link aggregation; and transmitting, through the logical link aggregation, data sent to the failed physical link;

wherein when the failure location is located between the access layer and the aggregation layer, the memory stores one or more instructions for instructing the processor to perform the steps of:

bundling a logical link that is located between the backbone layer and the aggregation layer and corresponds to the failed physical link with a logical link that is located between the backbone layer and the aggregation layer and corresponds to the physical link without failure.

8. The aggregation device according to claim 7, wherein the memory stores one or more instructions for instructing the processor to perform the steps of:

bundling a first logical port with a second logical port to form a third logical port in a forwarding table, wherein the first logical port is configured to receive data sent to the failed physical link, and the second logical port is configured to receive data sent to the physical link without failure.

9. The aggregation device according to claim 8, wherein the memory stores one or more instructions for instructing the processor to perform the steps of:

encapsulating data received from the third logical port, wherein the data received from the third logical port comprises the data sent to the failed physical link, and further comprises the data sent to the physical link without failure; and sending the encapsulated data to a fourth logical port, wherein the fourth logical port is configured to forward the data sent to the physical link without failure.

10. An aggregation device, comprising a processor and a memory, wherein the memory stores one or more instructions for instructing the processor to perform the steps of:

receiving failure information, wherein the failure information comprises a failure location of a failed physical link and an identity of more than one corresponding logical link, the failed physical link and more than one physical link form a link aggregation group (LAG), each physical link in the LAG corresponds to logical links with a same identity, and the logical links with the same identity in the LAG correspond to a telecom provider Retail Service Provider (RSP) device of a backbone layer and a receiving device of an access layer and forward data separately through at least two aggregation devices at an aggregation layer, wherein the aggregation layer is located between the backbone layer and the access layer;

bundling, according to the failure location and the identity of the more than one corresponding logical link, a logical link corresponding to the failed physical link with a logical link corresponding to a physical link without failure in the LAG to form a logical link aggregation;

transmitting, through the logical link aggregation, data sent to the failed physical link;

bundling a first logical port with a second logical port to form a third logical port in a forwarding table, wherein the first logical port is configured to receive data sent to the failed physical link, and the second logical port is configured to receive data sent to the physical link without failure;

wherein transmitting, through the logical link aggregation, data sent to the failed physical link, comprises:

encapsulating data received from the third logical port, wherein the data received from the third logical port comprises the data sent to the failed physical link, and further comprises the data sent to the physical link without failure; and sending the encapsulated data to a fourth logical port, wherein the fourth logical port is configured to forward the data sent to the physical link without failure.

11. An aggregation device, comprising a processor and a memory, wherein the memory stores one or more instructions for instructing the processor to perform the steps of:

receiving failure information, wherein the failure information comprises a failure location of a failed physical link and an identity of more than one corresponding logical link, the failed physical link and more than one physical link form a link aggregation group (LAG), each physical link in the LAG corresponds to logical links with a same identity, and the logical links with the same identity in the LAG correspond to a telecom provider Retail Service Provider (RSP) device of a backbone layer and a receiving device of an access layer and forward data separately through at least two aggregation devices at an aggregation layer, wherein the aggregation layer is located between the backbone layer and the access layer;

bundling, according to the failure location and the identity of the more than one corresponding logical link, a logical link corresponding to the failed physical link with a logical link corresponding to a physical link without failure in the LAG to form a logical link aggregation; and transmitting, through the logical link aggregation, data sent to the failed physical link;

wherein when the failure location is located between the backbone layer and the aggregation layer, the memory stores one or more instructions for instructing the processor to perform the steps of:

bundling a logical link that is located between the access layer and the aggregation layer and corresponds to the failed physical link with a logical link that is located between the access layer and the aggregation layer and corresponds to the physical link without failure;

bundling a first logical port with a second logical port to form a third logical port in a forwarding table, wherein the first logical port is configured to receive data sent to the failed physical link, and the second logical port is configured to receive data sent to the physical link without failure;

wherein transmitting, through the logical link aggregation, data sent to the failed physical link, comprises:

encapsulating data received from the third logical port, wherein the data received from the third logical port comprises the data sent to the failed physical link, and further comprises the data sent to the physical link without failure; and sending the encapsulated data to a fourth logical port, wherein the fourth logical port is configured to forward the data sent to the physical link without failure.

* * * * *